May 30, 1967     E. E. SWEENEY ETAL     3,322,319
FOOD PACKAGE ADAPTED FOR HEATING
Filed Dec. 14, 1964
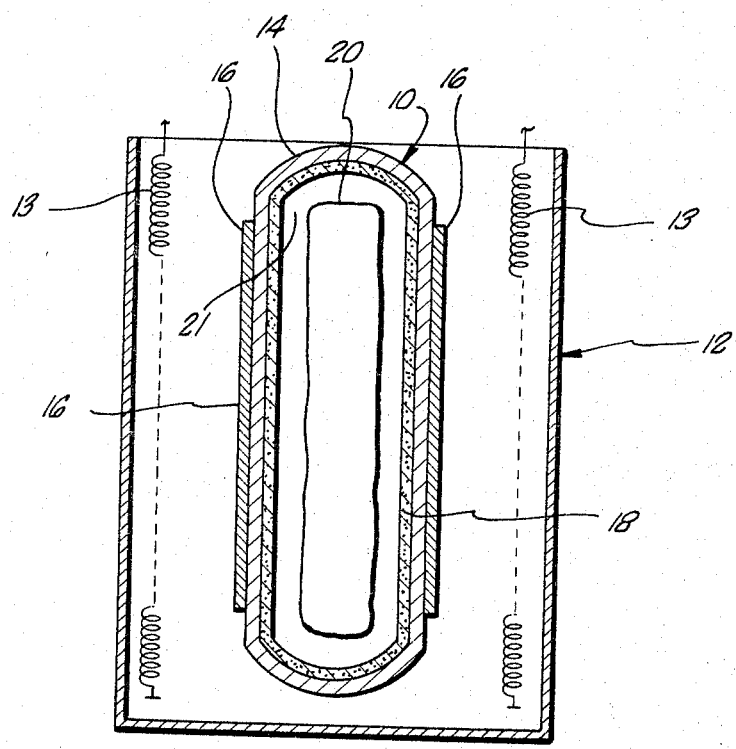
INVENTORS.
EDWARD E. SWEENEY
KENNETH E. STROUP
BY
Christie Parker + Hale
ATTORNEYS.

United States Patent Office 3,322,319
Patented May 30, 1967

3,322,319
FOOD PACKAGE ADAPTED FOR HEATING
Edward E. Sweeney, 6252 Drexel Ave., Los Angeles, Calif. 90048, and Kenneth E. Stroup, 10201 Louise Ave., Northridge, Calif. 91324
Filed Dec. 14, 1964, Ser. No. 418,160
5 Claims. (Cl. 229—3.5)

This invention relates to food packages, and more particularly to packages which contain frozen or cold foods to be heated or cooked within the package.

Many types of frozen foods are available today, and it is desirable to have a way to heat or cook them quickly and with a minimum amount of mess. This invention provides an improved package in which a frozen food can be quickly heated or cooked in a heating device such as a conventional toaster without depositing a mess in the device.

A conventional electric toaster provides a simple and effective source of intense heat for thawing and cooking frozen or cold foods. However, the heat from the electric toaster is so intense that it often overheats the package, or scorches the exterior surface of frozen food without thoroughly heating the interior.

Most toasters have a limited range of operating time before "popping up." Consequently, it is important that the package containing the frozen food be constructed so that it heats rapidly and transfers the heat quickly to the frozen food inside. This invention provides a package in which a typical frozen hamburger meat patty can be heated above normal human tongue tolerance within three minutes. Moreover, the food is heated thoroughly without damage to the package or the exterior surface of the food.

Briefly, the package consists of four components: a heat-conductive envelope that encloses and seals the food, a heat-absorbent layer on the exterior of the envelope, a porous material lining the heat-conductive envelope on the interior, and an evaporable substance within the porous material. The envelope of relatively good heat conductivity, say, aluminum foil, encloses a space adapted to hold frozen food to be heated, for example a frozen meat patty for a hamburger. A layer of relatively good radiant heat-absorbing material, say, hard grain paper, is disposed on the exterior of the envelope to facilitate rapid heating of the material of good heat conductivity. The heat-absorbing material can be any one of a number of things, such as paint, plastic, or black anodized aluminum. The heat absorbed by the material on the exterior of the envelope is transferred to the material of good heat conductivity and conducted through the envelope to apply a substantially uniform heat to the food within the package.

A layer of porous material is disposed on the inside surface of the envelope, and an evaporable material is disposed within the porous layer so the material is evaporated to permeate the envelope and the food in it on the application of heat.

In one form, the evaporable material is a liquid, such as water, which turns to steam and penetrates the food. The water prevents the overheating of the package, and speeds the transfer of heat from the hot walls of the package to the interior of the frozen food. Optionally, seasonings and flavorings are disposed within the porous layer to improve the taste of the heated food.

These and other aspects of the invention will be more fully understood from the following detailed description and the accompanying drawing, which is a sectional elevation of the presently preferred embodiment of the invention.

Referring to the drawing, a food-holding package 10 is disposed within a conventional toaster 12, which is shown only in schematic form, and which includes the usual electric heating coils 13. The package includes a closed envelope 14 of material impermeable to liquids and of relatively good heat conductivity, say, aluminum foil. A layer 16 of material, which is a relatively good radiant heat absorber, is bonded to opposite faces of the exterior of the envelope. The layer 16 may be of any suitable material, such as paint, plastic, hard grain paper, or black anodized aluminum.

The interior of the envelope is lined with a layer 18 of porous material such as paper. An evaporable substance such as water (not shown) is disposed within the pores of the layer 18. A food product 20, such as a frozen hamburger patty, is disposed within the food space 21 defined within the envelope 14 and porous liner 18.

When the package is placed in the toaster, the outer layer of radiant heat-absorbing material absorbs heat rapidly from the electrical coils of the toaster and transfers it to the aluminum foil envelope of high heat conductivity which spreads the heat rapidly around the entire area of the food and transfers heat rapidly to the inner porous layer, which contains the evaporable material. As the inner layer is heated, the evaporable material is vaporized, e.g., water is converted to steam, and thereby speeds transmission of heat to the frozen food within the package. At the same time, the vaporization of evaporable material next to the envelope of high heat conductivity removes heat from the outer portion of the package and thereby prevents its overheating.

The porous layer will also serve to absorb some of the food juices which are dispelled as the food is heated. The thickness and type of material of the porous layer may be varied for different foods and different heating problems. The amount and type of evaporable material within the porous layer may also be varied.

Thus, the package allows the use of a conventional electric toaster for the rapid heating of foods, especially frozen precooked food, without mess in the toaster and without burning the foods.

Packages made in accordance with this invention have provided for the thorough heating of frozen precooked hamburger patties about one-quarter inch thick, and one to two ounces in weight, within three minutes. The temperature of the hamburger on immediate removal from the toaster is above normal human tongue tolerance. A similar package without the radiant heat-absorbing material on its exterior surface and without the interior porous layer with evaporable water required seven to nine minutes in the toaster to achieve the same heating accomplished within the package of this invention in two and one-half to three minutes.

Although not entirely critical, the package size (with food enclosed) for the usual toaster is typically five inches or less in length, about five inches or less in width, and about one-half inch in thickness. This size approximates that of the ordinary piece of bread used in a toaster. The package may be sealed by simply folding over the edges of the envelope, particularly if it is made of aluminum foil, or by bonding the edges together. If the envelope is sealed tightly around its entire peripheries, then small slits (not shown) (less than one millimeter wide and less than five millimeters long) are made into the aluminum foil to allow excessive vapor pressure within the package to be released. Two slits will preferably be placed diagonally opposite each other, so that the package may be dropped into a toaster with any edge up and one slit will always be at the top of the package. The packaging thickness, alone, without food enclosed, varies according to the type of food to be enclosed and the type of heating required. As an example, one hamburger patty package (without food) is less than one millimeter thick and weighs less than one-fifth ounce. Thus, the packaging is both light weight and small in volume.

Because the package is relatively tightly sealed and provides for rapid heating of food, especially with the assistance of an evaporable substance, e.g., water, a variety of spices, flavors, and aromatic substances optionally are included within the package, but outside of the food item. The spices, flavors, and aromatic substances are within or on the porous layer, either separately or combined with the evaporable substance, or on the exterior food surface. These spices, flavors, and aromatic substances, which are selected in accordance with the food in the package, are activated or enhanced by the heating and steaming of the food item. Thus, the preferred embodiment of the package provides novel simultaneous heating and seasoning of foods.

The package is opened by a variety of methods, such as tearing of a strip across the package, or using an internal string (not shown) with an external end outside the package, or unfolding of folded edges, if this is the means of closing the envelope. The manner of opening depends in part on the kind of food item enclosed.

The aluminum or other metallic foil which forms the envelope extends beyond the heat-absorbent outer layer to allow for ready removal of the package from the toaster without injury to human skin, since the foil cools quickly and contains a very small amount of heat.

Of course, the package can be heated in other than an electric toaster. For example, it can be heated in an oven or solar stove. When the package contains a typical frozen meal, the time for cooking is reduced from fifteen or twenty minutes to ten or five minutes, or less, in an oven.

We claim:

1. A food holding and cooking package comprising an envelope of a material of relatively good heat conductivity, the envelope enclosing a space adapted to hold a food to be heated, a layer of relatively good heat-absorbing material on the exterior surface of a portion of the envelope, a layer of porous material on the interior surface of the portion of the envelope, and an evaporable material in the porous layer, the layer of porous material being at least substantially coextensive with the layer of heat-absorbing material whereby heat applied to the exterior surface of the package is transmitted to the porous layer to vaporize the evaporable material for rapid cooking of the food.

2. The package defined in claim 1 in which the evaporable material is water.

3. A food holding and cooking package comprising an envelope with opposing faces and formed of a material of relatively good heat conductivity, the envelope enclosing a space adapted to receive a food to be heated, a layer of relatively good heat-absorbing material on the exterior surface of each face of the envelope,. a layer of porous material on substantially the entire inner surface of the envelope, and an evaporable material in the porous layer, whereby heat applied to the exterior surface of the package is transmitted to the porous layer to vaporize the evaporable material for rapid cooking of the food.

4. The package defined in claim 3 in which the evaporable material is water.

5. The package defined in claim 4 in which the envelope includes a portion projecting beyond the layer of heat-absorbing material to provide a handle for picking up the package without touching the heat-absorbing material.

References Cited

UNITED STATES PATENTS

| | | | |
|---|---|---|---|
| 2,470,465 | 5/1949 | Boeren et al. | 206—46 |
| 2,518,406 | 8/1950 | Weber | 99—174 |
| 2,633,284 | 3/1953 | Moffett et al. | 206—46 |
| 2,759,830 | 8/1956 | Touceda | 99—174 X |
| 2,850,391 | 9/1958 | Gunsberg | 206—46 |
| 2,912,336 | 11/1959 | Perino | 99—174 |
| 3,026,209 | 3/1962 | Niblack et al. | 99—174 |
| 3,117,875 | 1/1964 | Burns et al. | 99—174 |
| 3,185,372 | 5/1965 | Ferraro | 229—3.5 |

FREDERICK L. MATTESON, JR., *Primary Examiner.*

ROBERT A. DUA, *Examiner.*